July 29, 1969 B. WARREN 3,457,897
APPARATUS EMPLOYED IN THIN LAYER CHROMATOGRAPHY
Filed Aug. 9, 1966 2 Sheets-Sheet 1

INVENTOR
BRIAN WARREN

ATTORNEYS

INVENTOR
BRIAN WARREN

BY

ATTORNEYS

United States Patent Office 3,457,897
Patented July 29, 1969

3,457,897
APPARATUS EMPLOYED IN THIN-LAYER CHROMATOGRAPHY
Brian Warren, High Wycombe, Bucks, England, assignor to Smith Kline & French Laboratories, Philadelphia, Pa., a corporation of Pennsylvania
Filed Aug. 9, 1966, Ser. No. 571,333
Claims priority, application Great Britain, Aug. 17, 1965, 35,324/65
Int. Cl. B05c 3/12
U.S. Cl. 118—412                                4 Claims

ABSTRACT OF THE DISCLOSURE

Apparatus for preparing and applying a gradient layer of adsorbents for thin-layer chromatography has a bottomless trough with an adjustable discharge slot provided with removable sealing means. The trough is removably secured to a base plate. To separate the contents of the trough into a plurality of compartments, there is provided a removable dividing member having a plurality of substantially parallel plates and closure means to close off the top of the trough to permit shaking the trough to mix the contents in each compartment.

---

This invention relates to apparatus employed in thin-layer chromatography and is concerned with apparatus for use in the preparation of gradient layers for thin-layer chromatography.

The use of gradient layers in thin-layer chromatography has been described by Stahl in Angew. Chem. 3, 784–791 (1964). In this paper there is described a device for the production of gradient layers, in which device a divider box consisting of a rectangular trough which can be divided into two or more compartments by means of a removable divider is mounted above a mixing vessel divided into numerous small compartments by disc-shaped elements rotatable by means of a shaft which can be turned by a hand-operated crank, the mixing vessel itself being incorporated in a conventional applicator for the production of chromatographic plates, whereby the division of different adsorbent suspensions or slurries, their mixing and the application of the various mixtures of different adsorbents to a supporting plate can be carried out in a single piece of equipment.

However, a disadvantage of the Stahl device is that it incorporates a number of moving parts, which necessitates a high degree of accuracy during the manufacture of the apparatus, hence making the apparatus relatively expensive.

It is an object of the present invention to provide an apparatus which is relatively simple and easy to construct, and hence may be produced more cheaply than the Stahl apparatus.

According to the present invention, an apparatus for use in the preparation of gradient layers for thin-layer chromatography comprises a mixing vessel having an open-bottomed trough, preferably of oblong rectangular shape, one of the longer walls of the trough being movable in a vertical plane so as to provide an outlet slot for a mixture of different adsorbents contained in the trough when the apparatus is in use, a removable partition adapted to be mounted diagonally in the trough when the apparatus is in use so as to form two compartments of substantially equal volume, a base plate adapted to be removably fixed to the mixing vessel so as to provide in association with sealing means for said outlet slot a substantially leak-proof base for the open-bottomed trough when the apparatus is in use, and a dividing member comprising a plurality of plate elements mounted on and substantially at right angles to a base element in substantially parallel spaced relationship, the number and size of the plate elements being such that they can be removably placed within the trough of the mixing vessel when the apparatus is in use so as to form with the base element when the base plate is fixed to the mixing vessel a substantially leak-proof mixing chamber divided into a plurality of small mixing compartments, the arrangement being such that in use the mixing vessel having the base plate fixed thereto can be fitted directly into a known applicator for the production of chromatographic plates in order to prepare the desired gradient layers for thin-layer chromatography.

The invention will now be described in more detail with reference, by way of example, to the accompanying drawings in which.

Figure 1:
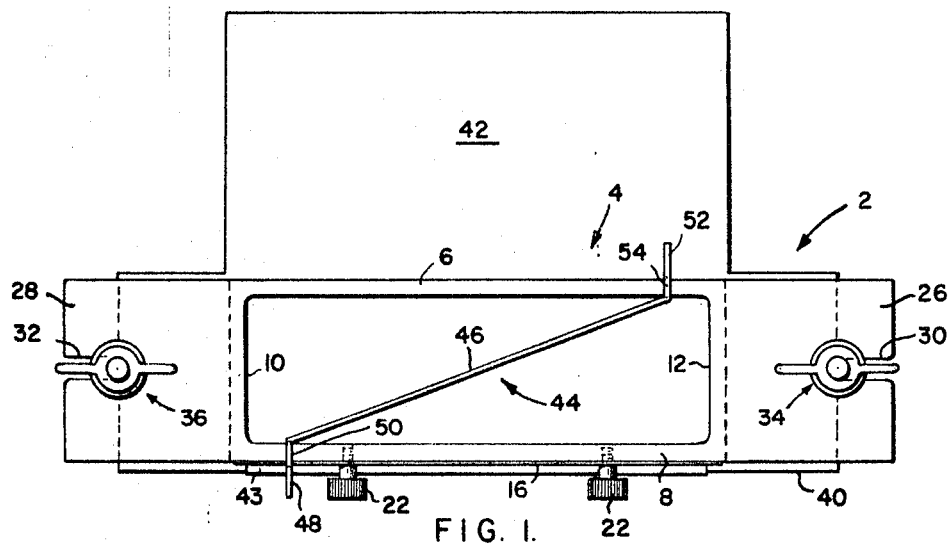
FIGURE 1 is a plan view of apparatus in accordance with the invention with the diagonal divider in place.

The apparatus shown in FIGURE 1 of the accompanying drawings is an adaptation of a known commercially available spreader for use in the production of coated plates for thin-layer chromatography, the spreader being sold in the United Kingdom by the Shandon Scientific Company Limited as the Shandon thin-layer spreader.

Figure 2:
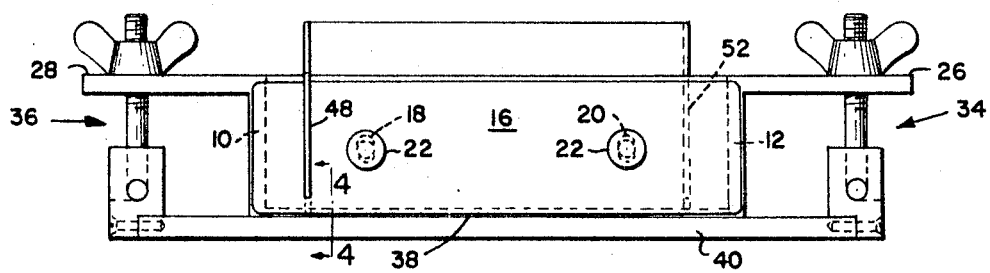
FIGURE 2 is a rear elevation of the apparatus of FIGURE 1.
Figure 4:
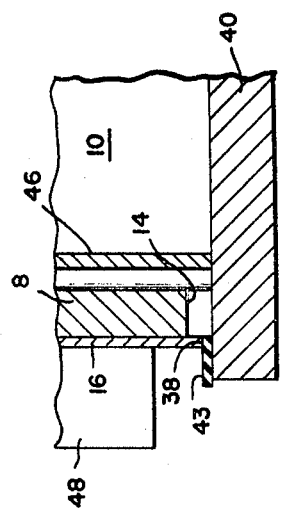
FIGURE 4 is a vertical section, partially broken away, taken on the plane indicated by the line 4—4 in FIGURE 2.

Referring to FIGURES 1 and 2, the apparatus 2 in accordance with the invention has a bottomless trough 4 formed by a front wall 6, a rear wall 8 and side walls 10 and 12. As best seen in FIGURE 4, the lower edge 14 of rear wall 8 is higher than the lower edges of the other walls which all lie in the same plane. An adjustable plate 16 is secured to the rear of wall 8 by virtue of slots 18 and 20 in plate 16 and screw member 22 passing through the slots and threadably secured to wall 8.

Side wall flanges 26 and 28 are provided with slots 30 and 32 for the reception of pivoting clamps 34 and 36 mounted on a base plate 40 which lies under trough 4 forming a removable bottom for the trough. Base plate 40 has a front projecting portion 42 which is dimensioned to fit in a chromatographic plate leveller (for example, the internationally known Shandon Unoplan Leveller made by Shandon Scientific Company Limited of England) in order that base plate 40 may be levelled with the plates to be coated. A rubber strip 43 is employed to seal the discharge slot 38 between plate 16 and base plate 40 as best seen in FIGURE 4.

Apparatus 2 is provided with a diagonal divider 44 having a central portion 46 fitting inside trough 4 to divide it into two substantially wedge shaped compartments and a rear outside depending arm 48 connected to central portion 46 by a bridge 50. A rear outside depending arm 52 is connected to the central portion by a bridge 54.

Figure 3:
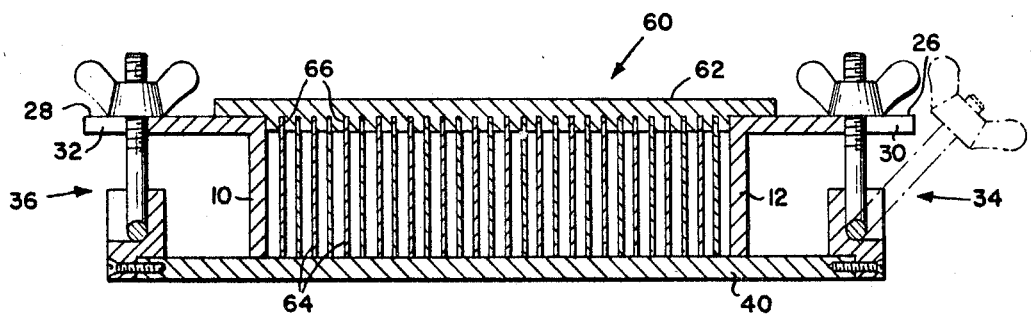
FIGURE 3 is a vertical section of the apparatus of FIGURE 1 with the second divider member in place.

Apparatus 2 is provided with a second divider 60 (FIGURE 3) which has a plate 62 forming a closure for the top of trough 4. A plurality of spaced divider plates 64 perpendicular to plate 62 are secured by a pressed fit in slots 66 in plate 62 and extend from front wall 6 to rear wall 8 to form a plurality of narrow compartments in trough 4.

In order to produce gradient layers for thin-layer chromatography the apparatus 2 is used in the following manner.

The open-bottomed trough 4 is fixed to the base plate 40 by means of the clamps 34 and 36, the movable plate 16 of the trough having been set to give the desired slot 38 for the later coating of the chromatographic plates. The slot 38 is then filled with a rubber strip 43 so that none of the subsequent contents of the trough will escape involuntarily during the mixing step to be carried out in trough. There is then fitted into the trough diagonal divider 44 (see FIGURES 1 and 2) so as to produce two generally wedge-shaped compartments of equal volume. Equal amounts of two different appropriate slurried adsorbents are then placed in the two compartments respectively. The diagonal divider 44 is then carefully removed and the linear divider 60 (FIGURE 3) is carefully fitted into the trough. The apparatus 2 is then shaken, the linear divider being held in position by hand whilst the apparatus is shaken, until the two adsorbents have been thoroughly mixed together in each of the mixing compartments formed by the divider 60 to the required extent.

Figure 5:
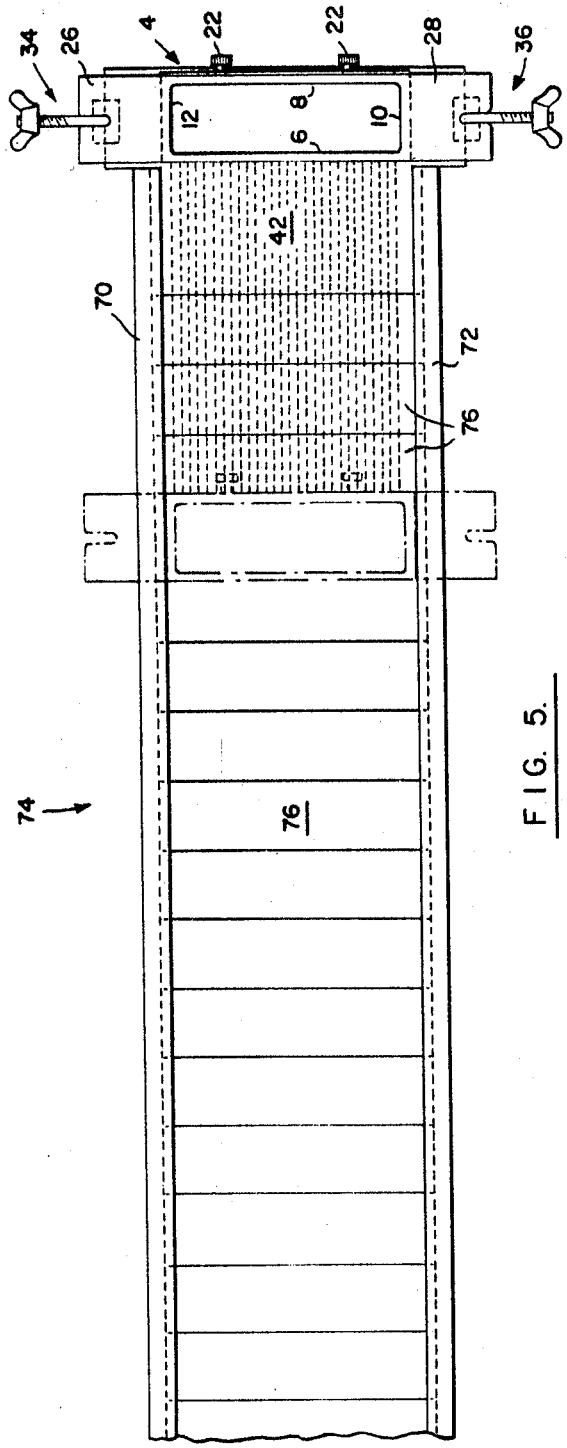
FIGURE 5 is a diagrammatic plan view showing how the apparatus of FIGURE 1 is used.

When mixing is complete, the base plate portion 42 is fitted under rails 70 and 72 of a leveller 74 as shown diagrammatically in FIGURE 5, the divider 60 is removed from the trough 4, the clamps 36 and 38 are released. Leaving strip 43 in position on base plate 40, the trough 4 is now advanced to the left as viewed in FIGURE 5 between rails 70 and 72 first over portion 42 and then over the glass plates 76 levelled up against rails 70 and 72 to coat the plates 76 with the adsorbent slurry mixtures.

The apparatus hereinbefore described with reference to the accompanying drawings may be constructed from any suitable material such as a metal, for example, aluminium.

It will be appreciated that various combinations of adsorbents may be used in conjunction with the apparatus of the invention. Examples of such combinations are silica gel (acidic) with silica gel (basic), silica gel with kieselguhr, and aluminium oxide with cellulose.

What is claimed is:

1. Apparatus for preparing and applying a gradient layer of adsorbents for thin-layer chromatography comprising:

walls forming a bottomless trough,
the lower edge of one of said walls terminating above the plane containing the lower edges of the other walls,
a plate adjustably mounted on said one wall its lower edge forming with a supporting surface an adjustable discharge slot,
means to control the flow of fluid through the slot,
a base plate for supporting the trough,
means to removably secure the trough to the plate, and
a removable dividing member comprising closure means to close off the top of the trough, and
a plurality of substantially parallel plates secured to said closure means and adapted to separate the contents of the trough into a plurality of compartments.

2. The apparatus of claim 1 in which the flow control means comprises removable sealing means in the discharge slot."

3. The apparatus of claim 1 in which the base plate has an extension portion extending in advance of the wall opposite said one wall for co-operation with a chromatographic plate levelling device.

4. The apparatus of claim 1 in which the flow control means comprises removable sealing means in the discharge slot and in which the base plate has an extension portion extending in advance of the wall opposite said one wall for co-operation with a chromatographic plate levelling device.

References Cited

UNITED STATES PATENTS

| 2,329,378 | 9/1943 | Kuehner | 118—413 |
| 2,526,991 | 10/1950 | Biddle | 118—412 |
| 3,145,410 | 8/1964 | Stahl | 118—415 X |

WALTER A. SCHEEL, Primary Examiner

JOHN P. McINTOSH, Assistant Examiner

U.S. Cl. X.R.

118—413, 415